United States Patent [19]
Paysinger et al.

[11] 3,733,939
[45] May 22, 1973

[54] APPARATUS FOR FORMING PRECISION SURFACES ON ENDS OF LARGE PIPES AND LIKE WORK PLACES

[75] Inventors: Joseph R. Paysinger, Ahwaz, Iran; Eugene F. Sims; Jerome W. Nelson, both of Houston, Tex.

[73] Assignee: CRC-Crose International, Inc., Houston, Tex.

[22] Filed: Oct. 14, 1970

[21] Appl. No.: 80,717

Related U.S. Application Data

[63] Continuation-in-part of Ser. No. 743,566, July 9, 1968, Pat. No. 3,608,406.

[52] U.S. Cl. .................................. 82/4 C, 144/205
[51] Int. Cl. .................................. B23b 5/16
[58] Field of Search .................... 82/4 C, 2 D, 52, 82/82; 144/205

[56] References Cited

UNITED STATES PATENTS

| | | | |
|---|---|---|---|
| 3,164,062 | 1/1965 | Hogden et al. | 82/4 C X |
| 3,293,963 | 12/1966 | Carroll et al. | 82/82 X |
| 3,103,140 | 9/1963 | Connelly | 82/2 D |
| 3,075,412 | 1/1963 | Kushmuk et al. | 82/4 C |
| 2,616,462 | 11/1952 | Haddican | 82/4 C |
| 1,674,372 | 6/1928 | Nonneman | 82/4 C |
| 938,058 | 10/1909 | Johnston | 82/4 C |

FOREIGN PATENTS OR APPLICATIONS

444,041   5/1927   Germany .............................. 82/52

*Primary Examiner*—Leonidas Vlachos
*Attorney*—Edwin M. Thomas

[57] ABSTRACT

A machine and method for precision cutting or machining of annular ends of pipe in the field, e.g., for preparation of large pipe ends for welding girth joints, comprises a cage shaped double ended aligning clamp which axially aligns and firmly supports a rotatable face plate. This plate carries multiple cutting tools and guide rollers, precision mounted on spring-biased pivoted arms which permit radially inward and outward motion of the tools and rollers with respect to the pipe end, to accommodate minor eccentricities in the work. The face plate is power driven around the axis of the clamp to carry out the machining operation. Each pivoted arm carries a cutter or equivalent tool, closely coupled with a precision guide roller which is also chamfered to slide into the pipe as the supporting arm pivots radially inward against the force of strong spring backing means. Each arm is pivoted to the plate radially inside the tool to produce a couple or moment of force, thus augmenting the spring means to hold guide roller and tool radially outward against the work. Cutters may be alike or complementary to each other. Use of plural tools distributes strain and facilitates high precision operations with minimum driving force and low distortion of the work and mechanism.

5 Claims, 5 Drawing Figures

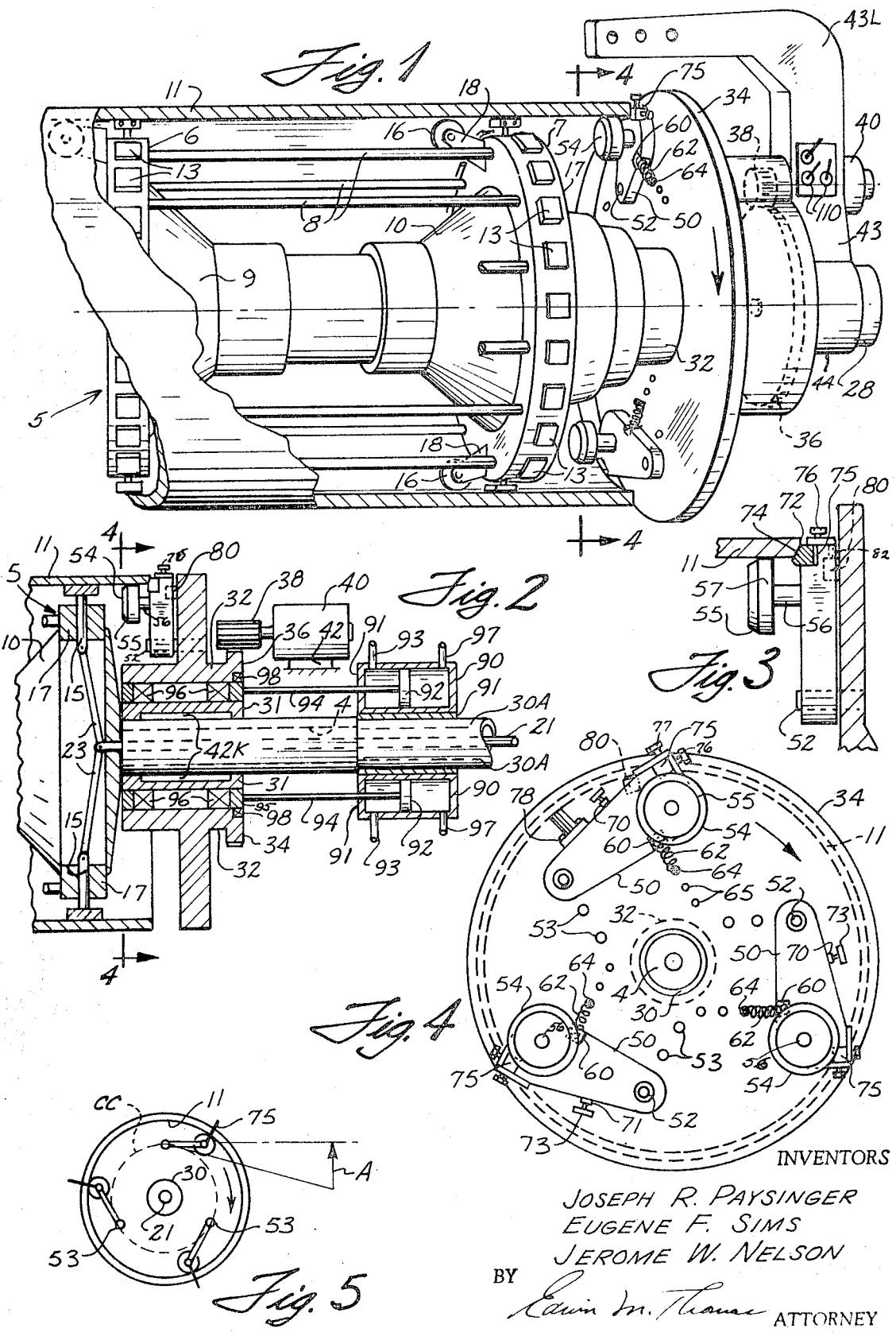

APPARATUS FOR FORMING PRECISION SURFACES ON ENDS OF LARGE PIPES AND LIKE WORK PLACES

This application is a continuation in part of application Ser. No. 743,556, filed July 9, 1968 and now U.S. Pat. No. 3,608,406.

BACKGROUND AND PRIOR ART

Various means have been used in the past for forming end surfaces of desired shape or contour on lengths of pipe and other annular elements. Large steel pipe sections, such as are used in major pipelines, for example, are commonly provided with preshaped beveled ends. These are usually machined in the pipe mill by large massive machinery, to provide the desired end formation shapes or bevels, etc. A typical example of a large machine of this character is described in U. S. Pat. No. 3,103,140 to Connelly. Such machines of course are not suitable for field use, nor are they intended for such. It is very desirable, in many cases, however, to be able to form particular end shapes in the field. Smaller and more portable equipment than that mentioned above has been suggested but, in general, these lighter machines are not sufficiently accurate or rugged for the high precision needed in end preparation operations, especially for automatic girth joint welding. The recent advent of automatic and semi automatic welding equipment especially for large diameter pipelines, has increased requirements for high precision machinery suitable for finishing pipe ends in the field preparatory to welding.

In order to machine the ends of large pipes in the field, with the accuracy and precision needed for automatic or semi-automatic welding, several requirements must be met. The end preparation machine must be competent to hold the pipe firmly, or, conversely must be rigidly attachable to the pipe, which is often much larger and heavier than the machine. The joint must be formed in a true plane, one which is perpendicular or substantially prependicular to the axis of the pipe, or at least to the axis of the terminal portion of the pipe. A given length of pipe of course may be curved to accommodate the terrain, or the pipeline route, but the joint formed by automatic welding equipment must be in a true plane or substantially so. Since pipes in the field are often somewhat out of round, due to rough handling as well as to defects in original manufacture, the apparatus preferably includes means for forcing the pipe end to substantially circular shape before the machining is started. However, variations in pipe wall thickness, as well as minor deviations from true round cross section, make it desirable or essential that the apparatus also be so designed that the cutting or other preparing tools follow the actual contour or surface of the pipe, preferably its interior surface, as a reference path, so as to make the finished shape or end contour as uniform as possible around the entire periphery. Thus means are needed to insure that the shaping tool will follow the pipe surface with high precision, even if the pipe is slightly out of round.

A firm backing surface or backing means which can be set accurately in parallel relation with the plane of the joint is needed to guide the cutting tool or tools as they operate. Such means are known, broadly, as in the Connelly patent mentioned above, but since a portable field machine usually cannot have the massive pipe holding equipment of that reference, it is necessary that a backing member, such as a face plate, be mounted to the pipe clamping means in such a way as to give the required precision to the operating parts. Cutting means in the form of conventional machining tools are preferred but cutting torches, which have been used in the past for some analogous operations, may sometimes be employed. Ordinarily the requirements for precision will favor mechanical cutters. Such tools as are used of course must be supported with sufficient rigidity to prevent chatter and vibration or rough operation. By using a plurality of tools, either similar in form or complementary to each other, stress and distortion in machine or work piece, or both, may be minimized. While the need for precision end preparation is particularly important for automatic or semi-automatic welding, it may be useful also for manual welding operations also. However, for manual welding, precision requirements may be much less critical than for automatic operations and the present invention is particularly designed for the latter though not limited thereto. Pipes of different diameters and wall thicknesses, as well as variations in metallurgy, need to be accommodated and the joint design or end contour may need to be varied widely. In a typical pipeline welding operation, each of the abutting ends to be welded together will have been shaped to provide in the joint a small interior V-groove, a narrow land or perpendicular surface with respect to the pipe axis in the middle part of the pipe thickness, and a wider V-groove on the outside. For thicker pipe walls, the outer groove may be a composite of a bottom narrow "V," with a wider V-groove at the outside. Setbacks or shoulders also may be required in some situations and the end preparation machine should be versatile enough to form all these and other cuts if and as needed.

The present invention contemplates that ordinarily the pipe will be stationary and the shaping operation will be performed by rotating a tool-carrying face plate or equivalent, mounted on the axis of the firmly supported internal pipe clamp. However, the principles of the invention, or at least some of them, are also adapted to use where the pipe can be rotated.

SUMMARY OF THE INVENTION

The parent application describes a relatively simple apparatus, consisting of an internal pipe clamp which supports the working equipment in or on the pipe, a large face plate which rotates adjacent and parallel to the end of the pipe being processed, plural arms pivoted on the face plate and each carrying a cutting tool and a guide roller, and driving means for rotating the face plate. According to the present invention, which includes aspects of the above and also includes improvements and modifications, the clamp is an elongated cage structure having two spaced heads or rings of champing elements, which assures axial alignment of the whole apparatus with the end part of the pipe being worked on. It uses a hydraulic system which operates both the clamp, in locking and releasing it, and also serves to feed the face plate and its tools into the work. The face plate is mounted on the axis of the clamp in precision bearings and is rigid enough to avoid any distortion or displacement of the cutting tools, their mounts, or their operations. Closely associated with the tools are guide rollers, both the tools and the rollers being carried by strong arms pivotally mounted on the face plate and mounted so that the cutters must closely follow the guidance of the rollers. The points at which the arms are pivoted to the face plate are radially inside the rollers and cutters i.e., well within the annular body to be treated so that an outward moment of force is created to keep the rollers firmly against the inside wall of the pipe at all times during cutting. In addition, strong spring means are used to urge the rollers into such contact, preferably with the inside wall of the work piece; the direction of rotation is chosen so that a radially outward thrust couple augments the force of the springs. Thus the shaping tools are firmly held against vibration, chatter, or other displacement. By using a plurality of arms, preferably at least three, the forces applied to the work in cutting, etc., are distributed, providing smooth and yet rapid machining operations. However, the invention contemplates the use of only one or two cutters in cases where cutting operations and/or stresses imposed are not too heavy.

BRIEF DESCRIPTION OF DRAWINGS

FIG. 1 is a side and partially perspective view, with certain parts broken away and/or in section, of a preferred form of the invention.

FIG. 2 is a longitudinal sectional view of the apparatus of FIG. 1, with some parts omitted and others modified slightly, taken substantially along the longitudinal axis of FIG. 1.

FIG. 3 is a detail view showing the relationship between a cutter element and a guide roller which monitors its operation.

FIG. 4 is a view of the face plate and operating tools, taken substantially along the line 4—4 of FIG. 1, showing certain parts in section and some elements diagrammatically.

FIG. 5 is a diagrammatic view showing directions of forces applied to the operating tools of the other figures.

DESCRIPTION OF PREFERRED EMBODIMENT

The apparatus comprises a hollow central shaft 4 which supports on its left end, as seen in FIG. 1, an elongated or double ring clamp 5. The latter comprises two spaced heads or rings 6, 7, each comprising a circular array of clamping shoes 13. A cage-like series of connecting bars 8 join two generally drum-shaped hollow head members 9 and 10 together. The latter have frusto-conical extensions directed towards each other and the head 10 at the right is secured to head 9 very rigidly so that operating mechanism supported on the right end of shaft 4 will travel with precision in a plane perpendicular to shaft 4. Means of generally conventional type are provided for operating the clamp shoes 13. When the clamp is fully inserted inside a hollow work piece, such as a large diameter pipe 11 to be welded, the axis of the clamp, and shaft 4, of course, are in accurate alignment with at least that part of the pipe that is engaged by the clamp. The clamp is set far enough into the pipe to give clearance for the rotating and preparation mechanism to be described in detail below. Guide rollers 16 spaced around the clamp periphery and pivoted on brackets 18 secured to the clamp cage help to direct the clamp as it is inserted into the pipe. These are mounted front and rear on the cage structure to run parallel with the pipe and facilitate guiding the clamp into the pipe.

The clamp shoes 13 are mounted in radially directed rods 15 projecting through guide ring elements 17 of annular shape which are secured to or integral with the head members 9 and 10. The rods 15 may be moved radially through rings 17 and outwardly to clamping position, as shown, or may be drawn inwardly to release position by any suitable operating means, such as structures operated by cams, toggles, etc. In the preferred form they are operated hydraulically through a toggle means, consisting of a longitudinally movable central shaft 21, as shown which, upon axial movement along the pipe line to right or left, as seen in FIG. 2, operates to move toggle rods or bars 23. These bars 23 are connected at their inner ends to a central hub member 25 fixed to the shaft 21. Each of these toggle bars 23 is pivotally connected at 26 to one of the radially slidable operating clamp rods 15, each of which carries one of the clamp shoes 13. Obviously, when the shaft 21 is moved to the left, as seen in FIG. 2, the clamp shoes are tightened. When shaft 21 is retracted towards the right, the clamp shoes are released from clamping position. Other types of toggle mechanism or cams, etc., can be used to operate and release the clamping shoes, as is well known in the art. The rod 21 may be operated by any suitable linkage means, preferably hydraulic means through appropriate mechanical elements. Operating cylinder 28, FIG. 1, preferably controls the linkage means which are not shown in detail in the drawings. The clamping mechanism per se is conventional in other respects and its detailed elements form no part of the present invention. However, its frame is designed and adapted in the present case to support for precision operation the requisite alignment and operating elements which serve to machine the pipe ends to the desired shape, as will next be described.

The principal support element for the end forming mechanism comprises a fixed main and non-rotatable hollow shaft 30 which surrounds shaft 4. On this hollow shaft is slidably mounted and keyed a non-rotating external sleeve 31. The latter supports for rotation a shell or gear-carrying member 32 which also it integral with or attached to a smooth, rigid face plate 34. A gear 36 is formed integrally with the rotatable shell member 32 which gear is designed to be driven in rotation around sleeve 31 and non-rotating hollow shaft 30 by a small elongated spur gear 38 driven by an electric, hydraulic, or other motor 40. This motor is supported by a fixed element 42 attached to a suitable part of a bar or frame member 43, or to the clamp frame apparatus, not shown in detail. A lift bar, shown partially at 43L, is secured to a housing 44, FIG. 1, for lifting the whole apparatus by a suitable crane or hoist, not shown, to insert the clamp into a pipe to be processed. The shell 32 is mounted to rotate on sleeve 31, being supported on precision antifriction bearings 96. Sleeve 31 is secured against rotation with respect to shaft 30 through a key 42K, it being understood that the sleeve 31 and shell 32, etc., can slide along the shaft for a limited distance.

Mounted on the left side of the face plate 34, as seen in FIG. 1, are a plurality, preferably three, strong, rigid arms 50, each pivotally supported on a pin 52 secured to the face plate. The pins 52 are mounted in holes 53 radially inside the outer ends of the arms. These pivotally mounted arms each can rock about its respective pivot pin 52 which constitutes its support on face plate 33. Extra holes 53, FIG. 3, are provided to accommodate several sizes of pipe. Each arm 50 carries a cutter-guiding and positioning roller 54 supported on a shaft 56 mounted near the opposite end of arm 50 remote from the pivot 52. Each roller has a forward conical portion 55, for guiding into the pipe as the apparatus is set up for operation. These rollers 54 are freely rotatable on their shafts 56 and are adapted to fit inside and roll around the inner surface of pipe 11, the end surface of which is to be machined to the desired shape or profile. Each roller 54 has a very narrow rolling surface see cylindrical surface 57. The reason for this is to insure that there will be high unit area pressure between the roller and the inside of the pipe being machined, so that dirt, encrusted rust in the pipe or other small and relatively soft obstructions will be crushed and thus minimize the displacement of the guide roller and its guiding effect on the associated cutter 75 which follows its movements very closely. Preparatory to using the machine, it is preferred to grind and thoroughly clean out a narrow band width inside the end of the pipe to be treated. This makes a clean, smooth path for the narrow cylindrical surface 57 of each roller 54 to follow. This path is kept clean during operation by one or more stiff wire brushes attached to arm or arms 50 as described below.

Each arm 50 is provided with a recess 60 to receive a strong compression spring 62. Springs 62 are seated against an abutment 64 attached to or formed on the face plate 34. These strong springs 62 are arranged to move the guide rollers 54 outwardly with respect to the face plate 34 on which they are mounted. In order to make the face plate usable for more than one size of pipe, additional holes 65 may be provided in which abutment elements 64 or their equivalent may be secured. Each arm 50 also carries a limit stop member 70 which is adapted to limit the extent to which the arms 50 can be swung outwardly by springs 62. Of course, when the guide rollers are forced inside the pipe for their operating positions, the interior of the pipe itself limits their movement radially outward from the center of the carrier face plate 34. Each stop 70 is preferably in the form of a lug 71 secured to the face plate and an adjustable screw stop member 73 threaded through this lug. The main purpose of arms 54 is to carry cutting elements 75, FIGS. 3 and 4, secured in suitable mounts and held by set screws 76 and 77, to machine the end of the pipe to the desired shape. The main purpose of rollers 54, which also are associated with the cutting devices 75 which devices actually cut or shape the pipe ends, is to assure that the prepared surface will be accurately machined all around the annular pipe end in a predetermined and accurate relationship to the inner periphery of the pipe. As explained above rolling surfaces 57 are narrow so that the rollers 54 can crush or push aside minor obstructions such as dirt, and maintain firm rolling relationship with the interior of the pipe. This also minimizes the width of the path that must be cleared by grinding as mentioned above. One or more brushes 78, FIG. 4, preferably stiff wire brushes are secured to one or more arms 50, to clear the path inside pipe 11, for rollers 54, of shavings, dirt, etc.

The reason for requiring all the accuracy and the careful relationship just mentioned is that pipes of the type described frequently are somewhat out of round or oval in form. Although a strong clamping device, such as that shown and described above, usually tends to bring the pipe back into very nearly true circular configuration, it may not actually be quite true or perfectly circular under some conditions. To form a sound weld by automatic means requires that the pipe end profile or joint design be the same all around the joint. When the pipe is to be machined with a profile which includes, by way of illustration, a perpendicular end surface or "land" element 72, FIG. 3, in combination with a narrow bevel element 74, it is obviously important that the width of the bevel element, and that of the perpendicular land surface 72 also, be substantially uniform all the way around the pipe end. Hence, as the rollers 54 are designed to move around the inside of the pipe, the machining or cutter elements 75, as shown in larger view in FIG. 3, see also FIG. 1, are arranged to cut exactly the profile required all around the end surface, since they are very rigidly and closely associated with their individual guide rollers. While all arms 50 may carry identical cutters 75, it is usually preferred to have different and complementary cutters on different arms to cut a selected part of the end shape or contour desired. Either way, the cutting forces are distributed. By taking moderate cuts with each tool, distortion of the pipe, chattering and other undesirable conditions that might produce a rough or uneven cut, are avoided.

Each arm 50, in addition to the rollers 54 and cutters 75 previously mentioned, carries a transversely mounted backing roller 80. This roller, in each case, is mounted on an axle 82 which extends substantially radially from mounting points 53, supported in suitable bearings 84 fastened to the arm 50. These rollers 80 arranged for smooth rolling contact with the face plate 34.

As shown in FIG. 2, when the face plate is moved towards the pipe the rollers 54, which have frusto-conical forward elements, and which the arms 50 carry, will be forced into the end of the pipe, thus compressing springs 62 against stops 64. Each roller 54 has its beveled outer or front surface 55 formed with a smooth taper, which facilitates the operation of forcing the roller into the end of the pipe. This requires rocking each arm 50 against the force of its compression spring 62, but these forces, though strong, are readily overcome by hydraulic means 90,92, while the opposing force is furnished by the clamp 13 tightly engaged inside the pipe 11.

The rollers 54, and the arms 50 which support them, are forced into operating position by face plate 34 after the clamp is locked in place. This is done from a pair of hydraulic cylinders 90 mounted on a fixed support member 91 secured against a shoulder on hollow shaft 30, the outer end 30A of which is of relatively reduced diameter. Each cylinder has a piston 92 connected by a piston rod 94 to a ring 95 which is attached to sleeve 31. By reason of the precision antifriction bearings 96, which serve as thrust bearings as well as giving rotational support, shell 32 is forced ahead to the left, FIG. 2, by pistons 92. On completion of an end finishing operation, the rollers 54, with their arms, cutters, etc., are withdrawn by reverse action of these hydraulic parts. Obviously, pneumatic means may be substituted in some cases.

The controls 110 for the hydraulic cylinders and pistons 90, 92, are not shown in detail, being conventional. It will be obvious however, that the fluid lines 93 and 97 are connected to a suitable hydraulic pump or other prime mover, e.g., a motor driven pump or the like so that the pistons will be moved in or out in unison to advance or retract the face plate 34 with its attached arms 50, together the follower rollers 54 and the machining, cutting or grinding elements 75. Further description appears to be unnecessary. Abrading wheels or flame torches may replace one or more of cutters 75.

It will be understood that the shell member 32 rotates around the central hollow shaft 30 and also around the clamp actuating shaft 21 within shaft 30. Suitable seals and retainers are provided, as shown at 98. The spur gear 38, which drives the spider and face plate, is elongated so that regardless of the longitudinal position of the larger gear 36 on the shell 32, the gears will remain in mesh and thus face plate 34 will be driven by the motor whenever motor 40 is operated. If desired, of course motor 40 can be arranged to move with shell 32.

The cutting tools are supported in conventional holders, not shown in detail, which are secured to the arms 50 in appropriate position for their function. A cutter such as shown at 75 in FIG. 3 is mounted so that the turnings of metal will curl outwardly away from the pipe and not turn into the inside where they would obstruct the rollers 54. However, each cutter is mounted so as to operate to its best advantage, as will readily be apparent to those skilled in the art.

The face plate is rotated in a direction such that the cutters and their associated guide rollers 54 will, in each case, be forced outwardly, that is so that the guide rollers will firmly engage the inside of the pipe, being reinforced in their contact by pressure from the springs 62. The resultant forces are indicated by the arrow A in FIG. 5. Disc or face plate 34 applies a tangential force to the mounting point 53 of each arm. However, the cutter engages that pipe 11 at a point radially outside of this mounting point, which latter is indicated by the circle C, FIG. 5. The inside surface of pipe 11 is represented by circle P. Cutter 75 is set across the end of the pipe at a suitable angle for efficient cutting, bearing in mind that the shavings or cuttings should be directed so that they will not foul up the guide rollers running inside the pipe. The resultant force applied to the roller 54 is such as to hold it firmly against the inside surface of the pipe. Not only does this give good contact between the guide roller and the pipe; it also steadies and stabilizes the cutter against vibration and chattering, making a clean cut. Actual operation shows that this is the case.

The simple hydraulic system for operating both the clamp and the face plate, which is forced into place hydraulically, causing the rollers to slide inside the pipe and the face plate to move to operating position with the cutters engaging the work, has been explained above. As cutting progresses, the parts keep moving up under hydraulic pressure until the machining operation is finished. Automatic stop means may be used; ordinarily an alert operator shuts down the rotation when the joint is ready for welding.

To summarize, as the apparatus is to be used, the clamping structure 13, etc., is first placed under general guidance of wheels 16 within the pipe 11 which is to be machined on its end surface. After the clamp has been inserted a suitable distance to bring plate 34 up to or near operating position, the clamp shoes 13 are operated by moving rod 21, by the hydraulic means described or by other suitable power, if desired, to expand them all into tight clamping position. Thereafter, the hydraulic pistons 92 are operated to push the sleeve 31, and the shell 32 further to the left, FIG. 2. This forces the tapered rollers 54 to move inside the pipe, swinging the arms 50 radially inward against the resistance of compression springs 62. These springs are strong enough to assure that the rollers 54 will fit tightly and roll firmly with their narrow rolling surfaces pressing strongly against the inner surface of the pipe at a narrow band near its forward end. The apparatus thus is pushed into the pipe until a proper gauge or stop position, appropriate for the cutting operation but not shown in detail, is reached. The shell member 32, or spider, and face plate 34 are then rotated by the motor 40 to machine the surface, the cutter elements 75 of course being shaped and preground to cut the desired profile or configuration on the end of the pipe. A metering device, under control of means 110, FIG. 1, not shown but controlling the hydraulic pistons 92 and associated parts, advances the cutters as metal is removed. If desired, one or two cutters can be shaped to cut one part of the profile and others can be shaped to cut the remainder.

The back-up rollers 80 on arms 50 normally ride on the face plate, backing up the cutting operation. When the guide rollers are to be forced inside the pipe for a cutting operation, rollers 54 are forced ahead by the face plate 34, causing the arms 50 carrying the cutters and the guiding rollers 54 to swing in as required. Since rollers 54 follow the inside pipe surface, and the cutters are closely associated with these rollers, the cutters must follow the periphery of the pipe, even though the pipe is somewhat out of round. As a result, each element of the end surface profile, the bevel face portion 74, for example, FIG. 3. is of uniform width all around the periphery of the pipe, as are also all other elements such as the perpendicular surface 72, assuming that the pipe wall is of uniform thickness. If the pipe has spots or portions that are thicker or thinner than others, the width of an element of a surface such as 72 may be varied slightly without detriment to formation of a good weld.

The exact configuration of the end surface or profile can be varied as desired, since the cutters 75 can be ground or shaped, and/or positioned on the arms 50 in the desired combination or shaping to obtain the required configuration. Method aspects of the invention are related to firm seating of the guide rollers at all times during operation and the fine control over cutting obtained thereby.

The apparatus and method just described have been found to be particularly useful for their purpose. The close and solid association of the guided cutters, and pilot rollers 54, on rigid and precision mounted arms pivoted on a rigid face plate, and backed up by rollers 80 all operatively associated with a firm clamp, provides a solid precision mounting that can be used dependably in the field. The apparatus on the whole is relatively light in weight, considering its high precision and rigidity. Its mounting and its construction for clamping and alignment with respect to the pipe, facilitate rapid as well as accurate machining.

Various modifications may be made in details of the equipment without departing from the spirit of the invention. Processwise, the invention involves an improved method for machining relatively narrow annular surfaces on hollow tubular members rapidly, conveniently and with a high degree of accuracy. Using an elongated, double ring internal clamp for primary axial and welding plane alignment, and employing surface-follower rollers 54, for guiding each cutter as it passes around the surface to be machined gives continuous firm and positive control over each cutter element. This makes it possible to maintain high accuracy in the width and other dimensions of the various cuts or formed elements of the end surface.

If desired, the follower 54 or equivalent, which is kept resiliently forced against a cylindrical surface of the pipe or other annular body, can be held in similar fashion against an outside surface by suitable modification of mounting. Also, in lieu of some or all of the cutting tools, the machining or shaping elements may be abrasive grinding tools, rotatable individually, for example by conventional means such as individual motors or otherwise operative under control of arms 50, etc.

This type of machining, usable in the field under pipeline laying conditions, provides an end surfacing or shaping accuracy which greatly facilitates the automatic welding of large pipelines. Such hitherto have not been commercially practical, as far as the present inventors are aware.

What is claimed is:

1. In apparatus of the character described for forming a precision machined surface on an end of a hollow cylindrical work piece such as a length of large diameter pipe and the like, the combination which comprises an elongated internal expanding clamp having a hollow tubular support adapted to be arranged axially of the hollow work piece, two widely spaced rings of clamping shoes on said support for firmly engaging said hollow work piece, the length of said clamp axially of the work piece and the spacing of said rings of clamping shoes being sufficient to insure accurate axial alignment of the clamp with at least the engaged part of said hollow work piece, means for operating said clamp between clamping and non-clamping positions, a relatively non-rotatable sleeve or spider on said tubular support, a face plate supported by precision bearings on said sleeve or spider for rotation in a plane transverse and substantially perpendicular to the cylindrical axis of said clamp, a plurality of arms each pivotally attached to said face plate at a point well inside the inner periphery of said work piece, a machine cutting tool on each arm adapted to perform a cutting operation on the annular end surface of said work piece, and a rotatable follower guide also carried by each arm in close association with said tool and adapted to engage the cylindrical inside surface of said work piece close to said annular end surface as the face plate is rotated with respect to the work piece.

2. Combination according to claim 1 which includes a brush mounted on a moving element for clearing a path inside the work piece for the follower guides.

3. Combination according to claim 1 wherein each arm carries a rotatable contact roller for following the inner cylindrical surface and wherein resilient means are disposed between the face plate and the arms to help force the follower against said cylindrical surface.

4. Combination according to claim 1 wherein the face plate carries a driven gear for rotating said face plate and driving the cutters in an orbital path around the central axis of the annular work piece.

5. Combination according to claim 1 which includes a single hydraulic system to operate the clamp and also to feed the machine tool and its associated follower guide into operating position with respect to the annular surface to be machined.

* * * * *

Disclaimer 3,733,939.—*Joseph R. Paysinger*, Ahwaz, Iran, and *Eugene F. Sims* and *Jerome W. Nelson*, Houston, Tex. APPARATUS FOR FORMING PRECISION SURFACES ON ENDS OF LARGE PIPES AND LIKE WORK PIECES. Patent dated May 22, 1973. Disclaimer filed Mar. 19, 1973, by the assignee, *CRC-Crose International, Inc.*

Hereby disclaims the portion of the term of the patent subsequent to Sept. 28, 1988.

[*Official Gazette September 4, 1973.*]